Figure 1:
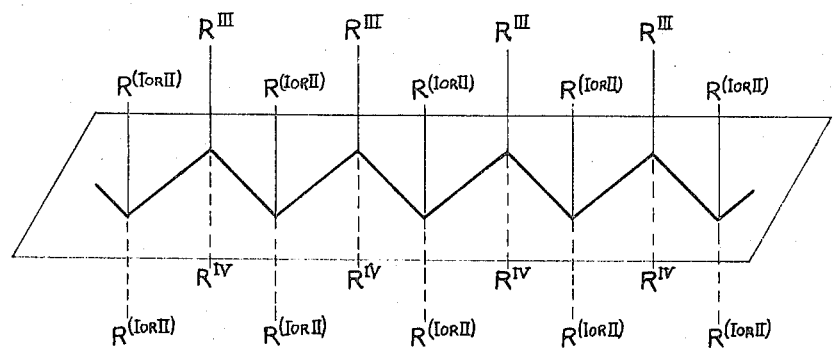

United States Patent Office 3,303,177
Patented Feb. 7, 1967

3,303,177
SUBSTANTIALLY LINEAR, REGULARLY HEAD-TO-TAIL POLYMERS OF DEUTERATED AND TRITIATED MONOMERS AND PROCESS FOR PRODUCING THE SAME
Giulio Natta, Mario Peraldo, and Mario Farina, Milan, Italy, assignors to Montecatini Edison S.p.A., Milan, Italy
Filed Dec. 11, 1959, Ser. No. 859,041
Claims priority, application Italy, Dec. 12, 1958, 18,481/58; Mar. 21, 1959, 4,828/59
5 Claims. (Cl. 260—93.7)

This invention relates to a new class of linear, regularly head-to-tail synthetic polymers. More particularly, the invention relates to such polymers of monomers having the general formula $$\underset{R^{II}}{\overset{R^{I}}{\diagdown}}\underset{\alpha}{C}=\underset{\beta}{C}\underset{R^{IV}}{\overset{R^{III}}{\diagup}}$$

These monomers can be regarded as derivatives of ethyene in which at least one of the hydrogen atoms attached to each carbon is replaced by deuterium, tritium, alkyl groups containing from 1 to 14 carbon atoms alkenyl groups containing from 2 to 10 carbon atoms, aryl, alkylaryl, or cycloaliphatic groups or by organic groups containing atoms different from hydrogen, such as O, N, halogen, S, P, Si, and Sn.

In the monomers polymerized according to this invention, $R^I$ is different from $R^{II}$ and $R^{III}$ is different from $R^{IV}$ and, furthermore, at least one of the substituents on the $\alpha$-carbon atom is different from the substituents on the $\beta$-carbon atom. In other words, $R^I$ and/or $R^{II}$ are/is different from both $R^{III}$ and $R^{IV}$.

It is known, from the publications of G. Natta and his associates, that higher alpha-olefins such as propylene, butene-1, etc. can be polymerized by means of anionic heterogeneous stereospecific catalysts containing transition metal compounds to polymers having an exceptionally regular structure which Natta has defined as the "isotactic" structure. These higher alpha-olefin polymers are characterized in that, at least for long stretches of the macromolecule, the tertiary asymmetric carbon atoms of successive monomeric units have the same steric configuration.

In order for the macromolecule to be able to crystallize, stretches having that structure must be at least long enough to be able to participate to the lattice of a crystallite.

An "isotactic" macromolecule of a higher alpha-olefin polymer such as polypropylene is, according to Natta et al., a macromolecule having substantially isotactic structure and an "isotactic" polypropylene according to Natta et al. is a polypropylene made up of or consisting of the isotactic macromolecules, as defined.

No sterically regular polymers of the ethylene derivatives in which both carbon atoms are substituted as indicated have been known heretofore. Moreover, it could not be foretold, on the basis of the available knowledge, whether or not sterically regular polymers of such monomers could be obtained or what kind of sterically regular structure such polymers would have, if they were obtained.

One object of this invention is to provide a new series or family of sterically regular polymers of the unsaturated monomers in which both of the carbon atoms are substituted as indicated.

Another object of the invention is to provide methods for producing the new series or family of sterically regular polymers.

These and other objects of the invention are accomplished by polymerizing the ethylene derivatives in which both carbon atoms are substituted as indicated with stereospecific catalysts described more in detail hereinbelow. We find that, using these stereospecific catalysts, we can obtain isotactic polymers from said monomers $$\underset{R^{II}}{\overset{R^{I}}{\diagdown}}\underset{\alpha}{C}=\underset{\beta}{C}\underset{R^{IV}}{\overset{R^{III}}{\diagup}}$$

and, moreover, can obtain different kinds of sterically regular polymers having different types of steric structure and with a different order of regularity. We have, in fact, produced a "family" of polymers of said monomers, the members of which family are distinctly different from each other.

Our results were unexpected, since the linear, head-to-tail polymers obtainable from these ethylene derivatives contain, in the main chain, a regular succession of the two different groups $$\underset{\underset{R^{II}}{|}}{\overset{R^{I}}{|}}\rightarrow \underset{\underset{R^{IV}}{|}}{\overset{R^{III}}{|}}\rightarrow$$
$$(\alpha) \qquad (\beta)$$

where the arrows indicate the direction of growth of the chain to which the group (which is bound to chain portions having a different length and/or configuration) belongs.

The two different groups can assume opposite configurations in the polymeric chain. It could have been expected therefore, that, because of the possible contemporaneous presence of different steric configurations along the polymer chain, it would not be possible to produce polymers having a high regularity of steric structure in addition to a high regularity of chemical structure.

Our new polymers have both types of regular structure: a chemical regularity exhibited in linearity of the macromolecules with head-to-tail enchainment of the monomer units, and a high regularity of steric configuration which exists for at least very long sections or stretches of the main chain of the macromolecules, and imparts crystallizability to the macromolecules.

The series of new polymers which, using stereospecific catalysts, we have produced from the ethylene derivatives in which both of the carbon atoms are substituted as indicated include:

(1) Polymers in which the succession, e.g., of all of the $\beta$-groups $$\left( C\underset{R^{IV}}{\overset{R^{III}}{\diagup}} \right)$$

and only of those groups is sterically regular (isotactic) at least for long portions of the main chain; in these polymers, the succession of the alpha-groups may be sterically irregular (atactic) and we define the polymers as "$\alpha$-atactic, $\beta$-isotactic."

(2) Polymers in which the succession of both the $\alpha$-groups and the $\beta$-groups is sterically regular (isotactic), at least for long chain portions, and which we call "di-isotactic" polymers; two types of di-isotactic polymers can be obtained, which we call threo-di-isotactic and/or erythro-di-isotactic, respectively, and which differ from each other only because of the relative steric position of the substituents.

(3) Polymers in which the succession of e.g., all the $\beta$-groups is sterically regular, while the succession of the $\alpha$-groups is sterically regular only for limited portions of the macromolecule and sterically irregular for the rest ($\alpha$-stereoblock, $\beta$-isotactic macromolecules).

Other types of macromolecules of lower sterical regularity are obtainable, such as $\alpha,\beta$-stereoblock macromolecules, β-stereoblock-α-atactic macromolecules, and α,β-atactic macromolecules.

In order for the macromolecules of regular structure to be able to crystallize, stretches of regular structure of sufficient length for them to be able to participate to the lattice of a crystallite must be present.

The steric configuration of our polymers can be represented schematically by supposing the main carbon atom chain to be extended in a zigzag form on a plane. For a β-isotactic polymer in which the β-carbon atoms in successive monomeric units, making up at least long stretches of the macromolecule, have the same steric configuration, the schematic representation shows all of the $R^{III}$ groups in the given chain section on one side of the plane, e.g., above, and all of the $R^{IV}$ groups in said chain section on the other side of the plane, e.g., below, this order of disposition with respect to the plane being reversible along the chain, so that a section in which all of the $R^{III}$ groups are, e.g., above the plane may be followed by a section in which all of the $R^{IV}$ groups are above the plane and the $R^{III}$ groups are below the plane.

In an α-atactic, β-isotactic polymer, the β-carbons have the regular, ordered steric configuration while the groups $R^{I}$ and $R^{II}$ attached to the α-carbon are randomly distributed on both sides of the plane, without a particular order.

In a di-isotactic polymer according to our invention the succession of both α- and β-carbon atoms is sterically regular (isotactic): the schematic planar representation of a sterically regular section shows either both the $R^{I}$ and $R^{III}$ groups of both the $R^{I}$ and $R^{IV}$ groups on one side of the plane. Depending on whether the starting monomer has the cis form or the trans form, we obtain the different types of di-isotactic polymers which have different, distinguishing physical properties, such as melting points, densities, X-ray, electron- or neutron-ray diffraction spectra; infra-red spectra; and nuclear magnetic resonance.

In an α-stereoblock-β-isotactic polymer according to our invention, the succession of the β-carbon atoms is sterically regular while some of the α-carbon atoms in successive monomeric units form isotactic blocks which are followed by or occur between atactic blocks in which the $R^{I}$ and $R^{II}$ groups are randomly distributed on both sides of the hypothetical plane.

Monomers which can be polymerized in accordance with our invention to give these different types of polymers, include mono-olefins having a non-terminal double bond, such as pentene-2, hexene-2 and other higher homologs; β-substituted styrenes, e.g., β-methylstyrene and its nuclearly alkylated, halogenated, etc., derivatives; alkenyl ethers as listed further below, alkenyl pyridines such as the α-, β- or γ-propenyl pyridines, and nuclearly substituted pyridines, thioethers, such as propenyl or butenyl-alkyl(aryl) thioethers, variously substituted alkenyl silanes such as propenyl-, butenyl silane and their higher homologs, and the alkenyl- alkyl silanes, and the corresponding tin derivatives, and monomers of the type: DHC=CHR, DHC=CDR, THC=CHR and THC=CTR in which D and T represent deuterium and tritium, respectively.

Starting with the monomer DHC=CH—CH$_3$ (α-deutero-β-methyl-ethylene), we have produced a series of new, well-defined polymers which are, in general, crystalline by X-rays examination, which show at the X-rays the same spectrum as isotactic polypropylene (the different mass of D and H being not distinguishable by X-rays) and which give characteristic, distinguishing infra-red spectra.

Figure 2:
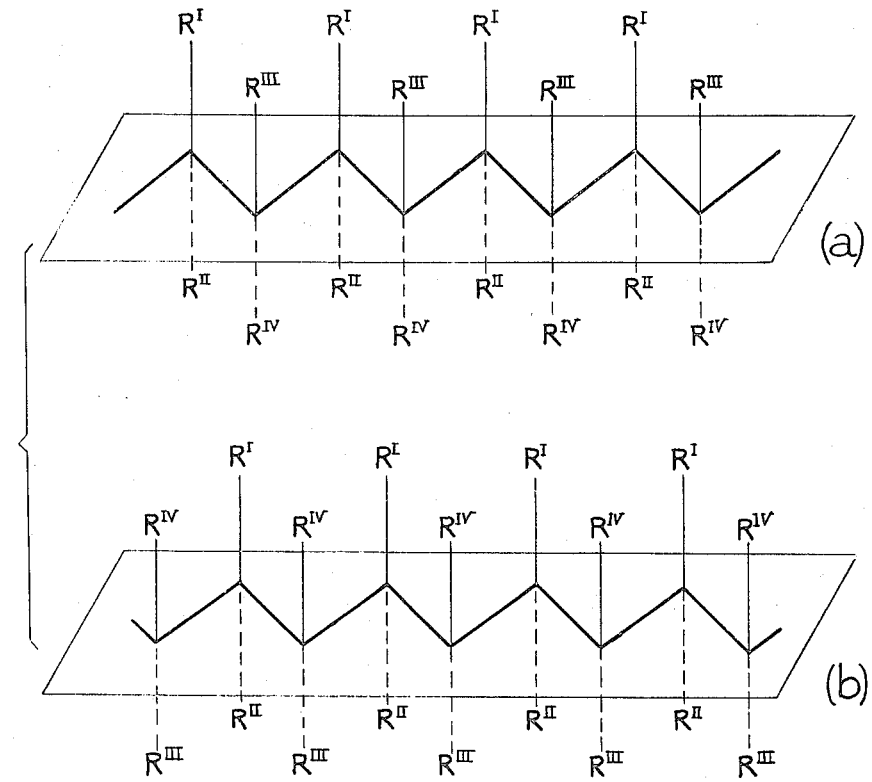
Figure 3:
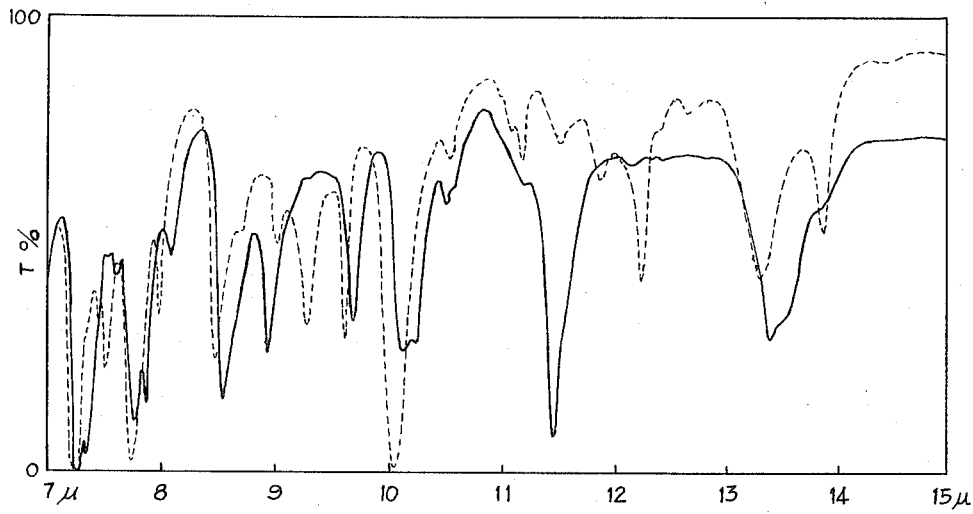
Figure 4:
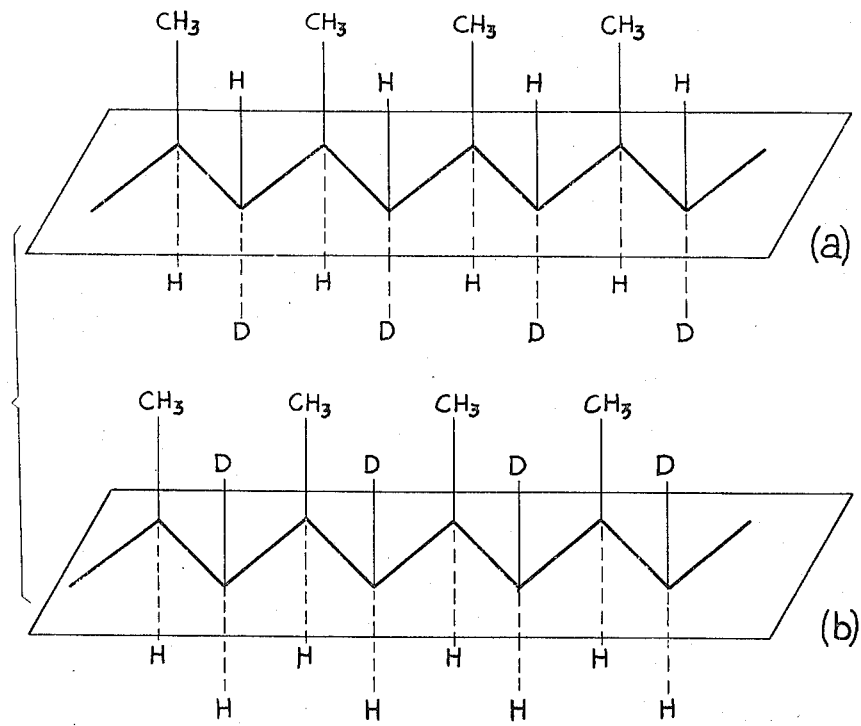

The invention will be discussed in detail in connecton wth our polymers from α-deutero-β-methyl-ethylene for purposes of clarity and illustration, reference being first had to the accompanying drawings, in which FIGURE 1 is a schematic representation of a portion of the macromolecules of a polymer according to our invention in which the β-carbon atoms of successive monomeric units have the same steric configuration, the main carbon atom chain being supposed extended in a zigzag form on a plane, and all of the $R^{III}$ groups in the particular case illustrated being found above the plane and all of the $R^{IV}$ groups being found below the plane;

FIGURES 2(a) and 2(b) are schematic representations of a portion of the macromolecule of a polymer according to our invention in which a series of α-carbon atoms having all a same steric configuration, and a series of β-carbon atoms having all a same steric configuration are present, that illustrated in FIG. 2(a) differing from that illustrated in FIG. 2(b) in the relative positions of the substituent groups;

FIGURE 3 shows the infra-red spectra of crystalline polymers of α-deutero-β-methyl ethylene, the spectrum for the polymers obtained from the cis form of the monomer being shown by the continuous line, that for the polymers of the trans form being shown by the dotted line; and FIGURES 4(a) and 4(b) show, respectively, the configuration of the two types of di-isotactic polymers which can be obtained from the two forms of α-deutero-β-methyl-ethylene.

Referring particularly to FIGURE 3, a comparison of the infra-red spectra of the crystalline polymer of the cis form of α-deutero-β-methyl-ethylene (continuous line) and that (dotted line) of the crystalline polymer of the trans form of the monomer, shows clearly that the two polymers are different from each other.

While the spectrum of poly (cis-α-deutero-β-methyl-ethylene) contains some weak bands due to monomeric units deriving from trans-α-deutero-β-methyl-ethylene, and the spectrum of poly (trans-α-deutero-β-methyl-ethylene) shows some weak bands due to monomeric units deriving from the cis form of the monomer, these result from the fact that the starting cis and trans monomers were not entirely pure; each monomer contained a small amount of the other monomer.

The differences in structure between our crystalline poly(cis-α-deutero-β-methyl-ethylene) and our crystalline poly(trans-α-deutero-β-methyl-ethylene) results from the fact that, as we have discovered, in the polymerization of the monomers with the stereospecific catalysts used in practicing our invention, a given configuration is imparted not only to the β-carbon atom, but also to the α-carbon atom, and the configuration of the α-carbon atom in the polymer main chain depends, surprisingly, on whether, in the monomer, the deuterium is in the cis or trans position with respect to the methyl groups.

The differences between the physical properties of our crystalline poly(cis-α-deutero - β - methyl-ethylene) and those of our crystalline poly(trans-α-deutero-β-methyl-ethylene) depend on the existence of two different regular and isotactic arrangements of the two groups

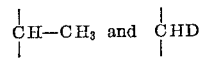

as shown in FIGURES 4(a) and 4(b) of the drawing.

As already noted above, we call these polymers which are isotactic in both α and β, of which poly(α-deutero-β-methyl-ethylene) is a particular example, "di-isotactic" polymers. In order to distinguish the two di-isotactic polymers from each other we employ the prefixes "erythro" and "threo" respectively for identifying the structures represented in FIGURES 4(a) and 4(b).

In the erythro-polymers of α-deutero-β-methyl-ethylene, and referring to the schematic representation of FIGURE 4(a), all of the CH$_3$ groups in a same chain section lie on one side of the plane and all of the D atoms lie on the opposite side of the plane.

In contrast, in the threo-polymers, the CH$_3$ groups and the D atoms lie on the same side of the plane, and all of the hydrogen atoms lie on the opposite side of the chain.

By polymerizing an equimolecular mixture of the cis and trans monomers with the stereospecific catalysts, we obtain a crystalline polymer in which only one of the two asymmetric carbon atoms, in this case the β-atom, presents a steric regularity of the isotactic type.

By starting with mixtures of the two monomeric isomers having a cis:trans ratio different from 1, we obtain polymers in which the regularity of configuration of the α-groups increases with increase in the distance of the ratio from unity.

Summarizing, we have produced, from α-deutero-β-methyl-ethylene, the following series of new crystallizable polymers all of which are isotactic in the β-position:

(1) Erythro-di-isotactic poly(α-deutero-β-methyl-ethylene) (FIG. 4a);
(2) Threo-di-isotactic poly(α-deutero-β-methyl-ethylene) (FIG. 4b);
(3) β-Isotactic-α-atactic poly(α-deutero-β-methyl-ethylene);
(4) β-Isotactic-α-stereoblock poly(α-deutero-β-methyl-ethylene).

The capacity of these polymers to crystallize and to exhibit crystallinity at the X-rays under normal conditions is associated with regularity of structure with respect to the configuration of the β-carbon atom. Those polymers in which a high percentage of successive monomeric units making up the macromolecule show a regular steric configuration of the β-carbon atom are the most highly crystallizable, exhibit the highest percent crystallinity at the X-rays, and are insoluble in organic solvents which dissolve the polymers having a less regular structure with respect to the configuration of the β-carbon atom and less ability to crystallize.

Therefore, the more highly crystallizable polymers having the greater regularity of steric structure with respect to the β-carbon atom can be separated from the polymerizate by extracting the latter with organic solvents which dissolve the less highly crystallizable polymers.

Illustratively, by polymerizing either of the pure forms (cis or trans) of α-deutero-β-methyl-ethylene, and then extracting the polymerizate successively with boiling ether and boiling n-heptane, or with boiling n-heptane only, we obtain a residue of the heptane extraction which consists of crystalline erythro-di-isotactic poly(α-deutero-β-methyl-ethylene) or of crystalline threo-di-isotactic poly(α-deutero-β-methyl-ethylene), which polymers have, in both cases, a highly regular structure, pronounced crystallinity by X-ray examination, and a high melting point (>160° C.).

The polymers which are insoluble in ether but extractable from the polymerizate with n-heptane comprise a β-stereoblock structure and exhibit less crystallinity at the X-rays than the heptane extraction residues. The heptane-extractable polymers comprising the stereoblock structure have different physical properties, such as different infra-red spectra, depending on whether the starting monomer is the cis or trans-isomer. On the basis of the infra-red examination, those polymers comprise di-isotactic blocks which have, depending on the monomer used, either an erythro-di-isotactic structure or a threo-di-isotactic structure.

In addition to the crystalline polymers, we have obtained amorphous, non-crystallizable polymers of both cis and trans α-deutero-β-methyl-ethylene. The amorphous polymers differ from the crystalline polymers and have physical properties which vary depending on the particular isomer which is polymerized.

The ether soluble fractions of the polymerizate are not crystalline by X-ray examination and have different infra-red spectra depending on whether they are obtained from the cis monomer or from the trans monomer. The differences in the infra-red spectra are attributed to the different structures of the di-isotactic segments present, and which are not sufficiently long to permit crystallization of the macromolecule to a degree that crystallinity therein is observable by X-rays examination. In one case, the di-isotactic segments have the erythro structure and in the other case the threo structure.

When the monomeric material polymerized in contact with our stereospecific catalysts is an equimolar mixture of the two isomers (cis and trans), and the polymerizate is extracted successively with boiling ether and n-heptane, the ether-extracted polymers are atactic in both α and β. On infra-red examination, these ether-soluble polymers obtained starting with equimolar mixtures of the cis and trans monomers are found to be different from the ether-extractable polymers obtained starting with either the substantially pure cis monomer or the substantially pure trans monomer. The ether-extractable polymers obtained from the monomer mixtures do not show the presence of the di-isotactic segments present in the ether-extractable polymers obtained starting with the individual monomers, except for a casual and scarcely probable statistical combination.

The heptane-extractable fraction or component of the polymerizate obtained from the equimolar mixtures of the monomers consists of polymers which are stereoblock in β and atactic in α.

The residue of the heptane extraction of the polymerizate obtained from the equimolar mixtures of the cis and trans monomers consists of β-isotactic-α-atactic poly(α-deutero-β-methyl-ethylene).

When mixtures of the cis and trans monomers other than equimolar mixtures are polymerized according to this invention, and the resulting polymerizate is extracted with n-heptane, the residue of the extraction consists of β-isotactic-α-stereoblock poly(α-deutero-β-methyl-ethylene).

Our new hydrocarbon polymers having a molecular weight in excess of 20,000, a highly regular structure, more particularly the di-isotactic polymers, are useful, because of their particular structure and crystallinity, for the preparation of plastics, fibers and films having exceptional mechanical characteristics and a high melting point.

We have discussed the invention in detail in terms of the polymers of monomers of the type of α-deutero-β-methyl-ethylene for purposes of illustration.

Polymers having a regularity of structure of the same type and similar to those listed under (1) and (2) above are also obtained from monomers of the same general formula

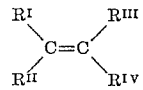

and containing oxygen atoms and in which $R^{II}$ and $R^{III}$ are hydrogen, $R^{I}$ is an aliphatic, cycloaliphatic or aromatic hydrocarbon radical containing from 1 to 10 carbon atoms, and $R^{IV}$ is a radical $OR^{V}$, where $R^{V}$ is a hydrocarbon radical which is the same as or different from $R^{I}$. The polymers of the last-mentioned monomers are obtained by starting with one of the stereoisomers (e.g., the trans-monomer) in a high state of purity, and using a stereospecific catalyst which is not inactivated by compounds containing etheric oxygen atoms.

The highly regular structure of these polymers is due to the fact that the carbon atoms of the

type which are present in the macromolecules of the polymer have the same steric configuration, at least for long portions of the chain and, also, the carbon atoms of the

type present the same steric configuration, that is, the polymers have di-isotactic structure.

Neither isotactic polymers of monomers containing an internal double bond, nor di-isotactic polymers of nonhydrocarbon monomers of this type have ever been described heretofore.

The polymers having such regularity of structure are obtained by starting with the substantially pure cis or trans form of the given oxygen-containing monomer in which $R^{IV}$ is the radical $OR^V$.

If necessary, the starting cis monomer can be purified by separating it from any trans monomer present with it, by physical means, and vice versa.

When mixtures of the two stereoisomeric forms (cis and trans) of the oxygen-containing monomers are polymerized by our method, the polymers obtained have, in general, an irregular structure and possess different physical characteristics, depending on the composition of the starting monomer mixture.

Mixtures of the cis and trans forms of the oxygen-containing monomers in a molar ratio of about 1:1 yield polymers which have a disordered steric structure and which are, therefore, amorphous.

The di-isotactic structure may allow the polymers to assume a crystalline form in the solid state. However, this does not mean that both the polymers obtained from the substantially pure cis monomers, and those obtained from the substantially pure trans monomers, are capable of crystallizing readily under all conditions.

The polymers obtained from the respective, individual cis and trans forms of the monomers are diastereoisomers of each other, the first being of the erythro di-isotactic type, and the other of the threo-di-isotactic type. The respective polymers therefore have a different steric structure, with a different relative orientation of the side groups the steric encumbrance of which can present a different hindrance to crystallization of the macromolecules.

We have found that the macromolecules having threo-di-isotactic structure crystallizes more readily than the macromolecules having erythro-di-isotactic structure. This can be explained by, e.g., the fact that when the polymeric chain is wound in a ternary spiral of the type characteristic of isotactic polypropylene, the threo-di-isotactic structure is much less hindered than the erythro-di-isotactic structure.

Examination of the infra-red spectra of the polymers obtained, respectively, from the substantially pure cis and trans forms of the monomers, shows that the polymers are different from each other, and from the polymers obtained from mixtures of the cis and trans monomers. The polymers obtained from the monomer mixtures have infra-red spectra which are intermediate between the spectra of the polymers from the pure cis monomers and the spectra of the polymers from the pure trans monomers.

The X-rays examination of polymers obtained from monomers which introduce bulky side groups of considerable steric encumbrance into the polymer chain shows, in general, that only the trans forms of such monomers yield polymers which exhibit marked crystallinity at the X-rays.

The monomers containing oxygen and which are polymerized to polymers of this type can be defined as 1-alkenyl ethers or as 1-alkyl-(or 1-cycloalkyl-, or 1-aryl)-2-alkoxy (or 2-cycloalkoxy- or 2-aryloxy)-ethylenes. specific monomers of this type include the following—

1-methyl-2-methoxy-ethylene (propenyl methyl ether);
1-methyl-2-ethoxy-ethylene (propenyl ethyl ether);
1-methyl-2-isopropoxy-ethylene (propenyl isopropyl ether);
1-methyl-2-butoxy-ethylene (propenyl butyl ether);
1-methyl-2-isobutoxy-ethylene (propenyl isobutyl ether);
1-ethyl-2-methoxy-ethylene (butenyl, methyl ether);
1-ethyl-2-isobutoxy-ethylene (butenyl isobutyl ether);
1-ethyl-2-butoxy-ethylene (butenyl-butyl ether);

and other higher homologues in which $R^I$ and $R^V$ are aliphatic substituents.

Other specific oxygen-containing monomers which can be used include

The alkyl phenoxy ethylenes in which $R^I$ is $CH_3$ or $C_2H_5$, and the corresponding derivatives containing variously substituted phenyl groups;

Monomers in which $R^V$ is an alkyl or aryl group and $R^I$ is an aryl group, e.g., phenyl-methoxy ethylene and its higher homologues.

When, $R^I$ and $R^V$ are aliphatic groups, the separation of the cis and trans forms by physical means is accomplished more easily if $R^I$ and $R^V$ contain a small number of carbon atoms, such as from 1 to 6.

When polymers having high melting point are desired, the monomer polymerized to polymers having a high degree of steric regularity is preferably a monomer of the formula given in which $R^V$ is a methyl or a branched alkyl group and preferably is a symmetrical group, e.g., $R^V$ is an isobutyl or neopentyl group.

The monomers of the type

$$R^ICH=CHOR^V$$

generally occur as mixtures of the cis and trans isomers, in different ratios depending on the method used for producing the monomers and on the equilibrium between the two forms. The polymerization of said mixtures leads, generally, to amorphous polymers, even when the catalyst used is one which is stereospecific with respect to one of the isomers, when such isomer is polymerized by tself.

However, we have discovered, as an additional feature of our present invention, a method by which a mixture of the stereoisomeric monomers can be completely transformed into a crystalline or crystallizable polymer. This method involves adjusting the composition of the mixture to values corresponding to or approximating the values of thermodynamic equilibrium between the two isomers. The adjustment of the mixture composition can be accomplished by separating the cis monomer from the trans monomer by physical methods, such as rectification, crystallization, chromatography, etc., subjecting the undesired monomer to a thermal or catalytic isomerization, and recycling it.

For instance, if the monomer 1-methyl-2-isobutoxy-ethylene is to be polymerized, and only the trans form is desired (boiling point 118–118.5° C. under atmospheric pressure) it is possible, by either a continuous or a batch process, to separate the cis form of the monomer from the trans form in a rectification column, by passing the vapors of the cis form (boiling point 110–111° C.) leaving the top of the column, through an oven heated to 300° C., in order to convert it into a cis-trans mixture having the ratio 70–30, and then feed this mixture to the rectification column.

By controlling the size of the plant, the cis-trans mixture can be converted, in the manner described, into the trans form only, the latter having the desired degree of purity. The trans form of the 1-methyl-2-isobutoxy-ethylene can then be polymerized to a crystalline or crystallizable di-isotactic polymer in accordance with the present invention.

Whereas the starting mixture of the cis and trans-stereoisomers normally polymerizes to an amorphous polymerizate, it can be transformed by the method just described into monomeric material which polymerizes to a crystalline polymer having a high melting point and suitable for the production of commercially valuable articles such as textile fibers and films which can be oriented by stretching.

The O-containing monomers of this type cannot be polymerized by means of the catalysts which are effective for the polymerization of vinyl hydrocarbons.

The stereospecific polymerization catalysts which are used in practicing our invention, when the monomer comprises organic groups containing atoms other than hydrogen atoms, include compounds of highly electropositive polyvalent metals having a small ionic diameter, such as Al, Be, etc., and compounds having properties intermediate the properties of polymerization catalysts which act with anionic mechanism (e.g., alkyl metal compounds) and the properties of polymerization catalysts which act with typically cationic mechanism (e.g., the halides of the metals).

Catalysts having such intermediate properties and which are stereospecific catalysts for our purpose of polymerizing the monomers containing O or other atoms other than hydrogen, include (1) Dialkyl aluminum monochlorides
(2) Monoalkyl aluminum dichlorides
(3) Mixtures of (1) and (2)
(4) Beryllium alkyl chlorides Certain transition metal compounds which have less cationic activity than the pure halides of the transition metals also function as stereospecific catalysts in the polymerization of the present monomers.

Examples of operative transition metal compounds include dihalo-dialkoxide or dihalo-dicarboxy derivatives of Ti, Zr or V, e.g., $TiCl_2(OR)_2$ or $VCl_2(OOCR)_2$, $TiCl(OR)_3$, $TiCl_3OR$ and similar compounds of zirconium, where R can be alkyl groups with 1 to 6 carbon atoms, or aryl groups.

Finally, cyclopentadienyl complexes of the type $$(C_5H_5)_2TiCl_2MeCl_2$$

where Me can be Al, Fe or Ti, can be employed.

In general, the lower the polymerization temperature, the more stereospecific is the polymerization. Therefore, it is preferred to operate at temperatures between about $+30°$ C. and about $-120°$ C.

The polymerization is generally carried out in solvents which are inert toward the catalyst, and which may consist may consist of non-polymerizable hydrocarbons, e.g., aliphatic, naphthenic or aromatic hydrocarbons. It is also possible to effect the polymerization in the absence of solvents.

The crystallizable polymers obtained by our process are thermoplastic. After being melted, the polymers can be restored to more or less completely crystalline solid state by annealing them, and depending on the duration of the annealing treatment.

Many of the polymers become amorphous when they are heated to a temperature substantially higher than the crystalline melting point and then quenched with cold water. The conversion to the amorphous state by quenching takes place without loss of the di-isotactic structure of the macromolecules and the macromolecules can be re-crystallized by heating the quenched polymer to a temperature a few tenths of a degree below the melting point. Such re-crystallization is favored if the heating is effected in the presence of small amounts of substances which are solvents or swellants for the polymer.

The crystallizable polymers of the monomers comprising the O-containing organic groups, and which have molecular weights in excess of 5,000, can be used as plastic materials in the usual processes of die-casting, injection molding, extrusion molding, rolling, etc.

The polymers which show the highest crystallinity at the X-rays, such as those obtained by the polymerization of a monomer having a very high content of the trans form can be used for the production of textile fibers by melt-extrusion. The polymer melt-extruded is preferably one having an intrinsic viscosity between 0.5 and $2.5 \times 100$ cc./g., determined in toluene at $30°$ C., and may have been freed of any sterically less pure fractions present therewith in the polymerizate, by solvent extraction of the less pure fractions.

The fibers can be oriented by stretching and show increased crystallinity after annealing thereof under tension.

Our crystallizable polymers can also be formed into fibers by wet and dry-spinning methods, by dissolving the polymer in a suitable volatile solvent such as benzene, carbon disulfide, etc. and extruding the resulting solution of appropriate spinning viscosity through spinnerets into an evaporative atmosphere for the solvent, or into a coagulating liquid such as methanol which extracts the solvent from the extruded streams issuing from the orifices of the spinnerets, thus precipitating the polymer in fiber form.

Mechanical mixtures or blends of polymers produced separately from the cis and trans forms of the monomers also have various uses in practice, such as in molding and coating operations. The blends obtained by mixing a polymer from a trans monomer with a polymer from the cis monomer are heterogeneous in the solid state and exhibit crystallinity at the X-rays if at least one of the two polymers of the blend is crystalline. The blends may comprise the polymers of the two different monomer forms in varying proportions of from 5% to 95% by weight of the one polymer to, conversely, 95% to 5% of the other.

Both the amorphous polymers and copolymers of the two different stereoisomeric forms of the monomer (stereocopolymers) are useful in the elastomer field. In general, all of the statistical copolymers containing more than 25% of the cis form of the given starting monomer are amorphous.

The following examples are given to illustrate the invention, it being understood that these examples are intended as illustrative only.

*Example 1*

Cis-$\alpha$-deutero-$\beta$-methyl-ethylene (cis $ld_1$ propylene) was prepared from cis-1-bromopropylene by reacting it with metal lithium finely divided in cold ether and then decomposing the propenyl lithium thus formed with heavy water. The configuration of the product is determined by examination of the infra-red spectrum of the hydrocarbon (a very intense absorption at $12.50\mu$ is observed) and from the configuration of the propenyl lithium derivatives (see E. A. Brande et al., J. Chem. Soc. 2078, 2085 (1951)).

52 N cc. of the cis $ld_1$ propylene are introduced, in the absence of air and humidity, into a glass vial containing 0.225 g. $Al(C_2H_5)_3$, 0.065 g. $TiCl_3$ and 30 cc. n-heptane. The vial is agitated at $20°$ C. After 36 hours the vial is opened and 0.087 g. polymer, which is fractionated by extraction with boiling solvent, is obtained.

Extraction: Percent
    Ether extract _____ 32.8
    Heptane extract _____ 4.2
    Residue after heptane extraction _____ 63.0

*Example 2*

Trans-$\alpha$-deutero-$\beta$-methyl ethylene (trans $ld_1$ propylene) was prepared, as described in Example 1 for the cis isomer, starting from trans-1 bromo propylene. The gaseous monomer presents a very intense absorption at $10.25\mu$ in the infra-red spectrum.

257 N. cc. trans $ld_1$ propylene are polymerized according to the process described in Example 1.

0.287 g. polymer is obtained. On fractionation of the polymer with boiling solvents the following results are obtained:

Extraction: Percent
    Ether extract _____ 12.7
    Heptane extract _____ 3.5
    Residue _____ 83.8

*Example 3*

A mixture of trans-$\alpha$ and cis-$\alpha$-deutero-$\beta$-methyl-ethylene ($ld_1$ propylene) in the ratio of 1:2, is obtained according to the method described in Example 1 from a mixture of trans- and cis-1-bromo-propylene.

82 N. cc. of this gas are polymerized according to Example 1, thus obtaining 0.131 g. polymer which is fractionated with boiling solvents and yields—

Extraction: Percent
  Ether extract _____ 14.5
  Heptane extract _____ 6.2
  Residue _____ 79.3

The structures of the polymers obtained according to the above examples have been discussed hereinabove and are reported in the accompanying figures.

*Example 4*

1.8 g. 1-methyl-2-methoxy-ethylene (propenyl methyl ether) having a boiling point of 48.3–48.4° C. (760 mm.) and containing more than 96% of trans form (determined by infra-red analysis) are polymerized at −70° C. under an inert atmosphere and in an anhydrous medium, using as a catalyst 0.2 g. Al($C_2H_5$)$_2$Cl and as a solvent anhydrous toluene (30 cc.).

The monomer is added over a period of one hour and the reaction is continued for 15 hours.

The solution is then poured into 200 cc. methanol thus precipitating the polymer which is washed with methanol and dried.

1.45 g. solid polymer are obtained in addition to 0.35 g. oils recovered by distilling the solvents.

Figure 5:
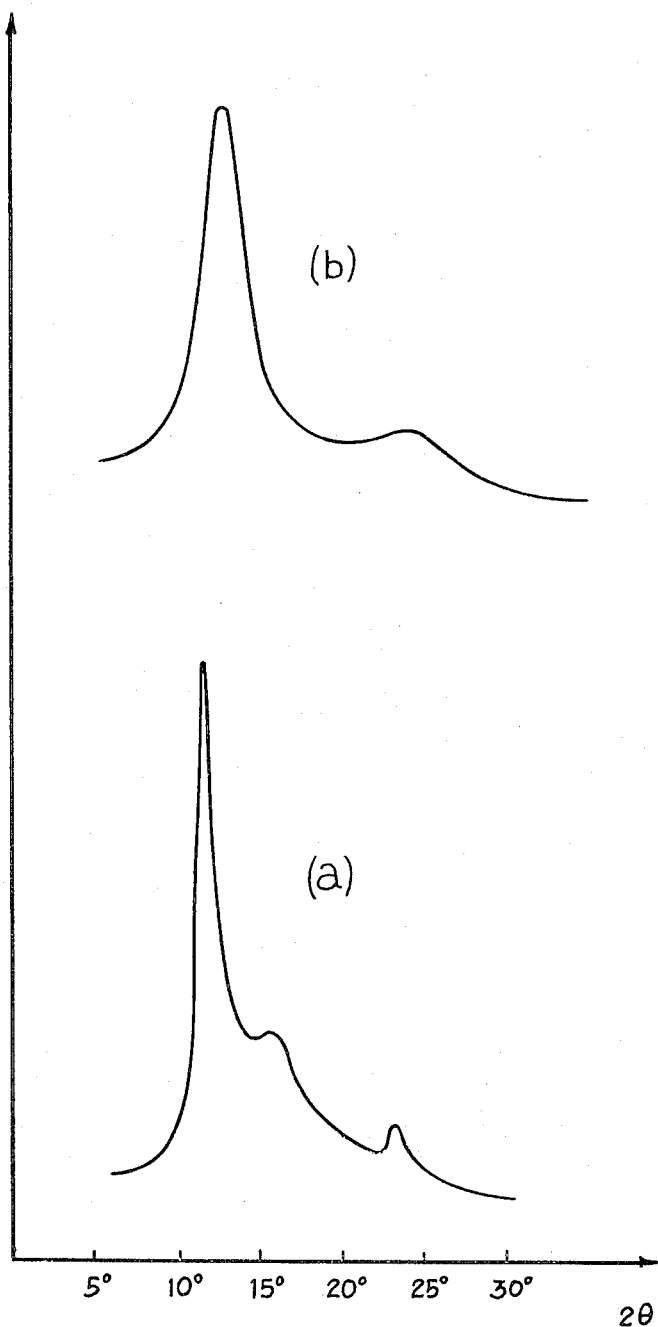

The polymer is crystalline at the X-rays (see FIGURE 5(*a*); powder spectrum CuK α) recorded with a Geiger counter and has a melting point of about 200° C. (polarizing microscope).

Figure 6:
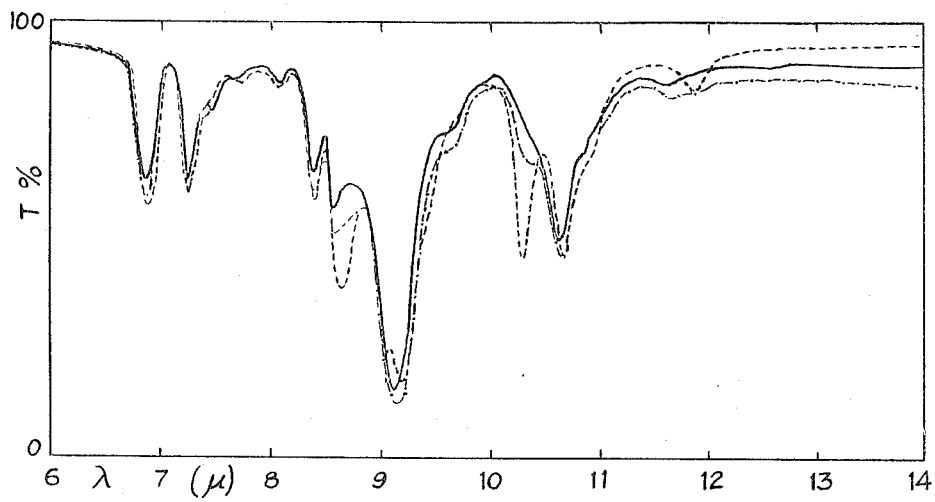

The infra-red spectrum is reported in FIGURE 6, dotted line. The crude polymer has an intrinsic viscosity, determined in toluene at 30° C., of 0.418×100 cc./g.

*Example 5*

The polymerization is carried out as in Example 4 but using 1.3 g. 1-methyl-2-methoxy-ethylene with a boiling point of 44.7–44.8° C. at 764 mm., containing about 90% of the cis form. 0.8 g. solid polymer and 0.3 g. oils are obtained.

The polymer is amorphous at the X-rays (FIGURE 5(*b*)), and presents an infra-red spectrum (FIGURE 6, continuous line) different from that of the polymer of Example 4. Intrinsic viscosity, in toluene at 30° C.; 0.44×100 cc./g.

*Example 6*

The polymerization is carried out as in Example 4 but using 2.3 g. 1-methyl-2-methoxy-ethylene, boiling point 46.1–46.3° C. at 760 mm., containing about 50% of cis-form. 1.8 g. solid polymer and 0.27 g. oils are obtained.

The polymer is amorphous at the X-rays and presents an infra-red spectrum (FIGURE 6 dot-and-dash line) different from those of the polymers reported in Examples 4 and 5.

Intrinsic viscosity in toluene at 30° C.: 0.535×100 cc./g.

*Example 7*

The polymerization is carried out as in Example 4 but using 3.9 g. 1-methyl-2-methoxy-ethylene containing more than 90% of trans-form, and 0.1 g. Al($C_2H_5$)$_2$Cl.

3.0 g. white crystalline polymer and 0.27 g. oils are obtained.

Intrinsic viscosity (in toluene at 30° C.) of the crude (unfractionated) polymerizate: 0.28×100 cc./g.

The polymer is fractionated by solvent extraction. The following fractions are obtained:

|  | Percent by weight | [η] in toluene at 30° C. |
|---|---|---|
| Soluble in cold acetone | 26.5 solid crystalline | 0.24 |
| Soluble in boiling acetone | 31.0 solid crystalline | 0.33 |
| Insoluble in acetone | 42.5 solid crystalline | 0.33 |

*Example 8*

The polymerization is carried out as in Example 4 but using 1.62 g. 1-methyl-2-butoxy-ethylene, boiling point 127.1° C. at 764 mm., $n_D^{20}$=1.4143, containing 97% of trans-form.

1.50 g. solid polymer, which is crystalline at the X-rays, are obtained. Intrinsic viscosity in toluene at 30° C.: 0.79×100 cc./g.

Figure 7:
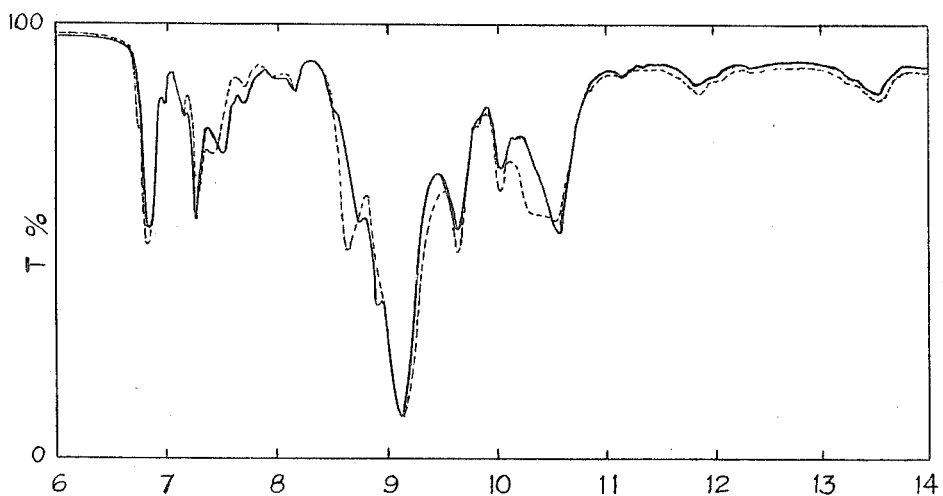

The infra-red spectrum is shown in FIGURE 7, dotted line.

*Example 9*

The polymerization is carried out as in Example 4 but using 1.7 g. 1-methyl-2-butoxy-ethylene, boiling point 120.8° C. at 768 mm., $n_D^{20}$=1.4126, containing more than 94% of cis-form.

1.50 g. amorphous polymer the infra-red spectrum of which is different from that of the polymer obtained according to Example 8, are obtained (FIG. 7, continuous line).

Intrinsic viscosity in toluene at 30° C.: 0.68×100 cc./g.

*Example 10*

The polymerization is carried out by operating as in Example 4 but using 3.05 g. 1-methyl-2-isobutoxy-ethylene, boiling point 117.1°–118.0° C. at 760 mm., $n_D^{20}$=1.4099, containing 91% of trans form.

Figure 8:
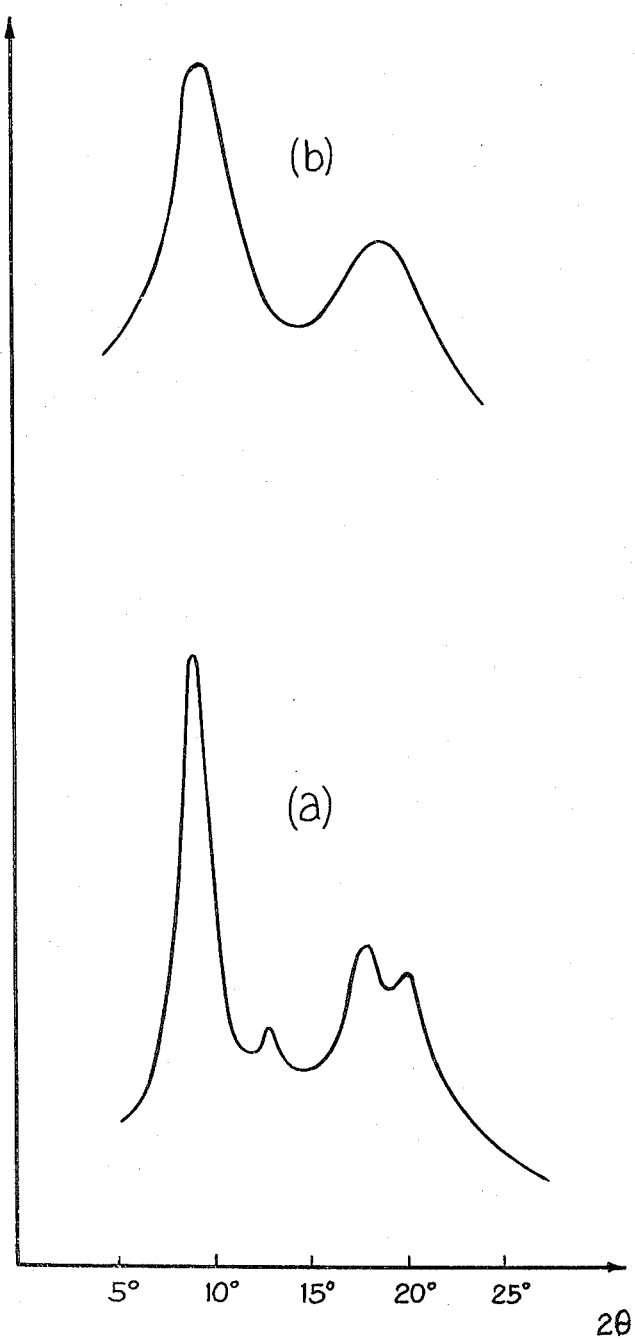
Figure 9:
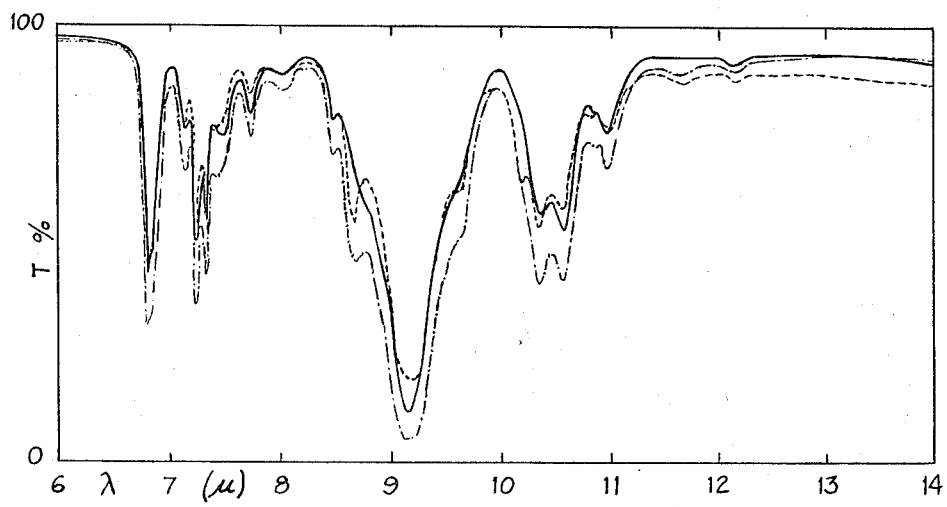

3.0 g. solid polymer which is crystalline at the X-rays (FIGURE 8(*a*)) are obtained. The infra-red spectrum is shown in FIGURE 9, dotted line.

The polymer has a melting point higher than 180° C. The crude product is subjected to solvent extraction thus obtaining the following fractions:

|  | Percent by weight | [η] in toluene at 30° C. |
|---|---|---|
| Soluble in boiling acetone | 1.5 oil | (1) |
| Soluble in cold methyl-ethyl ketone | 2.0 oil | (1) |
| Soluble in boiling methyl-ethyl ketone | 28.6 crystalline solid | 0.52 |
| Soluble in ethyl acetate | 3.0 crystalline solid | 0.76 |
| Soluble in boiling ethyl ether | 7.2 crystalline solid | 1.06 |
| Residue from the ether extraction | 57.7 crystalline solid | 0.96 |

[1] Not determined.

Fibers were obtained from both the crude fraction and from the less soluble fractions by extrusion of the molten polymerizate or fraction through spinnerets. The fibers thus obtained were hot stretched and crystallized by annealing.

The X-rays spectra of the stretched fibers show an orientation of the crystals with the chain axis parallel to the fiber axis. The fiber obtained from polymers of the same steric structure have better mechanical properties the higher the molecular weight of the fraction which is melt-spun. These fibers, because of their high melting point and good mechanical characteristics, are useful as textile fibers.

*Example 11*

The polymerization is carried out by operating as in Example 4 but using 4.2 g. 1-methyl-2-isobutoxy-ethylene, boiling point 110.8° C. at 762 mm., $n_D^{20}$=1.4079, containing 97% of cis-form.

4.1 g. solid hard polymer which is amorphous at the X-rays (FIG. 8(*b*)) and the infra-red spectrum of which is different from that of the polymer obtained in Example 4 (FIG. 9, continuous line) are obtained.

Intrinsic viscosity in toluene at 30° C.; 0.49×100 cc./g.

*Example 12*

The polymerization is carried out by operating as in Example 4 but using 4.1 g. 1-methyl-2-isobutoxyethylene, boiling point 114–115° C. at 760 mm., $n_D^{20}$=1.4089, containing equal proportions of the cis and trans-form.

3.8 g. of a solid polymer amorphous by X-rays examination, and the infra-red spectrum of which is different from the spectra of the polymers of Examples 10 and 11, are obtained (FIG. 9, dot-and-dash line).

Intrinsic viscosity in toluene at 30° C.: 1.10×100 cc./g.

Example 13

The polymerization is carried out by operating as in Example 4 but using 1.9 g. 1-ethyl-2-butoxy-ethylene, boiling point 138.5° C. under atmospheric pressure, $n_D^{20}=1.4180$, containing more than 93% of cis form.

0.64 g. solid polymer, amorphous by X-rays examination are obtained.

Example 14

The polymerization is carried out by operating as in Example 4 but using 2.7 g. of a mixture of cis- and trans-1-ethyl-2-butoxy-ethylene in the ratio of 1:3.

1.06 g. polymer (white powder) amorphous by X-rays examination, and the infra-red spectrum of which is different from that of the polymer of Example 13, are obtained.

Example 15

The polymerization is carried out as in Example 4, employing 3 g. 1-methyl 2-ethoxy-ethylene containing 98% of trans form, and 0.12 g. Al(C$_2$H$_5$)$_2$Cl.

2.6 g. solid polymer and 0.07 g. oils are obtained. The polymer is crystalline at the X-rays, and has an intrinsic viscosity, in toluene at 30° C., of 0.21×100 cm.$^3$/g.

Example 16

5.5 g. 1-methyl-2-ethoxy ethylene containing 94% of cis form are polymerized as in Example 4, employing 0.06 g. Al(C$_2$H$_5$)$_2$Cl as a catalyst.

1.08 g. amorphous polymer and 0.12 g. oils are obtained.

The intrinsic viscosity of the amorphous polymer, in toluene at 30° C., is 0.44×100 cm.$^3$/g.

Example 17

4.2 g. 1-ethyl-2-methoxy-ethylene containing 98% of trans-form are polymerized as in Example 4, with the aid of 0.2 g. Al(C$_2$H$_5$)$_2$Cl.

2.3 g. of crystalline polymer and 0.12 g. oils are obtained.

Example 18

2.5 g. 1-ethyl-2-methoxy-ethylene containing 93% of cis-form are polymerized with the aid of 0.2 g.

Al(C$_2$H$_5$)$_2$Cl 0.37 g. amorphous solid and 0.21 g. oils are obtained.

Example 19

Polymerizing 1.6 g. of 1-methyl-2-methoxy-ethylene cis-form with the aid of 0.1 g. Al(C$_2$H$_5$)Cl$_2$, under the conditions of Example 4, 1.4 g. amorphous polymer are obtained.

Example 20

1.2 g. 1-methyl-2-methoxy-ethylene containing 97% of trans-form are polymerized as in Example 4, with the aid of 0.05 g. Al(C$_2$H$_5$)Cl$_2$.

0.6 g. of crystalline polymer are obtained.

Example 21

1.4 g. 1-methyl-2-methoxy-ethylene containing 82% of trans and 18% of cis-form is polymerized as described in Example 4, with the aid of 0.3 g. Al(C$_2$H$_5$)$_2$Cl. 0.7 g. of a weakly crystalline polymer are obtained, which shows an intrinsic viscosity (in toluene at 30° C.) of 0.3.100 cm.$^3$/g.

It will be apparent from the examples that the kind of stereospecific catalyst used depends on the starting monomer. When the monomer contains, as the substituent groups, only hydrogen atoms and hydrocarbon radicals, we can use the stereospecific catalysts which, when used with e.g., propylene, orient the polymerization to a highly isotactic, crystallizable polypropylene. Such stereospecific catalysts are obtained by (1) starting with a substantially solid, hydrocarbon-insoluble crystalline low valency halide of a transition metal, such as the crystalline chlorides of Ti, V and Zr, and (2) mixing the crystalline halide with a metal alkyl such as, e.g., metal alkyls of Al, Be, Mg and Zn, in which the alkyl radicals contains 2–5 carbon atoms.

In contrast, when the monomer comprises organic groups containing oxygen or other atoms different from hydrogen, the metal alkyl compounds, boron trifluoride etherate and the transition metal compounds of reduced cationic activity, discussed herein, are used as stereospecific polymerization catalysts.

It will also be evident, from the examples given, that the solvents which are most efficient for use in fractionating the polymerizates to separate the polymers of lower steric regularity and lower crystallizability from the highly regular, highly crystallizable polymers, will depend on the starting monomer. For instance, when the monomer is α-deutero-β-methyl-ethylene, the fractionation is generally most efficient when ether and n-heptane are used successively, or when n-heptane is used directly. On the other hand, when the monomer is 1-methyl-2-isobutoxy ethylene the preferred solvents for use in the fractionation are acetone, methylethyl ketone, ethyl acetate and ethyl ether in that order, it being understood that the more readily soluble fractions will dissolve in and be extracted by the solvents for the more difficultly soluble fractions so that more readily soluble and less soluble fractions can be extracted simultaneously by means of the solvents for the more difficultly soluble fractions.

It is not possible to state, for the polymers from every monomer, and from both the cis- and trans-forms of every monomer, the exact organic solvent or series of organic solvents which will function most efficiently in the fractionation process. However, illustrative examples have been given for treating polymerizates of typical monomers and the organic solvent or solvents to be used in other given cases can be readily determined empirically, it being understood that the separation is by fractional dissolution on the basis of the steric structure and/or the degree of regularity of the steric structure of the macromolecules making up the different fractions. The fractions made up of macromolecules having the highest steric regularity and crystallizability are less readily soluble or remain as residue after the fractional dissolution.

In general, the fractionation can also be effected using the same solvent at different, progressively increasing, temperatures as shown in Example 7.

The preferred polymerization temperature depends on the starting monomer and the stereospecific catalyst employed. When the steorspecific catalyst is one prepared by mixing a crystalline halide of, e.g., Ti, with a metal alkyl such as triethyl aluminum, the polymerization is carried out at a temperature in the range −20° C. and +150° C. On the other hand, using metal alkyl compounds per se, or transition metal compounds per se as the stereospecific catalysts for the polymerization of monomers containing organic groups such as OR$^V$, the polymerization temperature is preferably lower, and in the range +30° C. to −120° C.

It will be apparent from the foregoing discussion and examples that this invention provides a wholly new class of polymers derived from ethylene derivatives in which both of the C atoms are substituted as indicated. Various modifications may be made in practicing the invention, with respect to the monomer selected for polymerization, the isomeric form of the monomer selected, and the stereospecific catalyst used, without departing from the spirit of the invention and, therefore, we intend to include in the scope of the appended claims all such variations and changes in details as may be apparent to those skilled in the art from the description and examples as disclosed herein.

What is claimed is:

1. Normally solid, normally crystalline poly(alpha-deutero-beta-methyl-ethylenes), said polymers consisting prevailingly of macromolecules in which both of the two asymmetric carbon atoms of each successive monomeric unit making up the chain show isotactic stereoregularity, at least for long portions of the chain.

2. Polymers according to claim 1, characterized in comprising di-isotactic macromolecules.

3. Poly(alpha-deutero-beta-methyl-ethylenes) according to claim 1, characterized in predominantly consisting of monomeric units deriving from one of the cis and transforms of alpha-deutero-beta-methyl-ethylene.

4. Normally solid, normally crystalline poly(cis-alpha-deutero-beta-methyl-ethylene), said polymer consisting prevailingly of substantially linear, regularly head-to-tail macromolecules in which both of the two asymmetric carbon atoms of each successive monomeric unit making up the chain show isotactic stereoregularity, at least for long portions of the chain.

5. Normally solid, normally crystalline poly(trans-alpha-deutero-beta-methyl-ethylene), said polymer consisting prevailingly of substantially linear, regularly head-to-tail macromolecules in which both of the two asymmetric carbon atoms of each successive monomeric unit making up the chain show isotactic stereoregularity, at least for long portions of the chain.

References Cited by the Examiner

UNITED STATES PATENTS

| 2,104,000 | 12/1937 | Reppe et al. | 260—91.1 |
| 2,457,661 | 12/1948 | Grosser | 260—91.1 |
| 2,773,052 | 12/1956 | Cohen et al. | 260—91.1 |
| 2,827,447 | 3/1958 | Nowlin et al. | 260—94.9 |
| 2,880,199 | 3/1959 | Jezl. | |
| 2,886,561 | 5/1959 | Reynolds et al. | 260—94.9 |
| 3,048,573 | 8/1962 | Heck | 260—91.1 |
| 3,067,185 | 12/1962 | De Coene et al. | 260—91.1 |

FOREIGN PATENTS

| 549,638 | 12/1957 | Belgium. |
| 1,019,090 | 11/1957 | Germany. |
| 807,204 | 1/1959 | Great Britain. |
| 820,469 | 9/1959 | Great Britain. |

OTHER REFERENCES

Wall et al.: Oxidative Degradation of Styrene and α-Deuterostyrene Polymers, J. of Physical Chemistry, 60, 1306–1311 (1956).

Schildknecht et al.: Ind. and Eng. Chem., 1998–2003, 41, 1949.

Vandenberg: J. Pol. Sci. 41, 519–20 (1959).

Semon et al.: Rubbers and Plastics Age 40, No. 2, pp. 139–142, February 1959.

Schildknecht et al.: Ind. & Eng. Chem., February 1947, pp. 180–186.

Schildknecht: Vinyl and Related Polymers, John Wiley & Sons, Inc., New York, pp. 609–614 relied upon.

Saltman et al.: JACS, Nov. 5, 1958, vol. 80, pp. 5615–5622.

Gaylord et al.: Linear and Stereoregular Addition Polymers, Interscience Publishers, Inc., New York, 1959, pp. 371–71.

JOSEPH L. SCHOFER, *Primary Examiner.*

MILTON STERMAN, HAROLD N. BURSTEIN, WILLIAM H. SHORT, *Examiners.*

H. D. ANDERSON, L. M. MILLER, W. G. GOODSON, M. B. KURTZMAN, *Assistant Examiners.*